United States Patent
Morse et al.

(10) Patent No.: US 6,949,195 B2
(45) Date of Patent: Sep. 27, 2005

(54) SYSTEM AND METHOD FOR REMOVING CONTAMINANTS FROM LIQUID

(75) Inventors: Dwain E. Morse, 2655 Montrose Pl., Santa Barbara, CA (US) 93101; Wade O. Morse, Santa Barbara, CA (US); Thomas G. Matherly, Lompoc, CA (US)

(73) Assignees: Dwain E. Morse, Santa Barabara, CA (US); Jerry Friedman, Inglewood, CA (US)

( * ) Notice: Subject to any disclaimer, the term of this patent is extended or adjusted under 35 U.S.C. 154(b) by 364 days.

(21) Appl. No.: 10/180,216

(22) Filed: Jun. 25, 2002

(65) Prior Publication Data

US 2002/0195398 A1 Dec. 26, 2002

Related U.S. Application Data

(60) Provisional application No. 60/300,768, filed on Jun. 25, 2001.

(51) Int. Cl.$^7$ .................................................. C02F 1/24
(52) U.S. Cl. ..................... 210/703; 210/704; 210/732; 210/738; 210/199; 210/205; 210/206; 210/221.2
(58) Field of Search ................................. 210/703, 704, 210/705, 707, 732, 738, 199, 205, 206, 221.2

(56) References Cited

U.S. PATENT DOCUMENTS

| | | | | |
|---|---|---|---|---|
| 2,220,574 A | * | 11/1940 | Little et al. ................. | 210/205 |
| 2,360,811 A | * | 10/1944 | Kelly et al. ................. | 210/608 |
| 2,746,605 A | * | 5/1956 | Baum ......................... | 210/137 |
| 2,759,607 A | * | 8/1956 | Boyd et al. ................. | 210/704 |
| 2,765,919 A | * | 10/1956 | Juell .......................... | 210/703 |
| 2,779,731 A | * | 1/1957 | Kelly et al. ................. | 210/519 |
| 2,994,432 A | * | 8/1961 | Schulter ..................... | 210/101 |
| 3,179,252 A | * | 4/1965 | Vrablik ....................... | 210/120 |
| 3,623,608 A | * | 11/1971 | Waterman ................... | 210/101 |
| 3,977,970 A | * | 8/1976 | Willis et al. ................ | 210/703 |
| 3,986,954 A | * | 10/1976 | George et al. .............. | 210/706 |
| 4,790,944 A | * | 12/1988 | Gordon et al. .............. | 210/706 |

FOREIGN PATENT DOCUMENTS

| | | | |
|---|---|---|---|
| GB | 1444027 | * | 7/1976 |
| SU | 798048 | * | 1/1981 |
| WO | 99/11352 | * | 3/1999 |

* cited by examiner

*Primary Examiner*—Thomas M. Lithgow
(74) *Attorney, Agent, or Firm*—Kelly, Lowry & Kelley, LLP

(57) ABSTRACT

A method for removing contaminants from a liquid includes filtering objects of a relatively large dimension. The liquid is then mixed with additives to adjust the chemistry of the liquid. The liquid is pressurized and directed through a gasification device to dissolve gas into the liquid. This is accomplished by directing the liquid into an inlet of a hydrocyclone of the gasification device, directing the liquid exiting the hydrocyclone upwards to remove large bubbles, and removing liquid containing dissolved gas from a bottom portion of a vessel of the gasification device. The pressure of the liquid is then reduced and the liquid is introduced into a separation tank, and the contaminants are removed from the liquid by stratification. The treated water is removed from the separation tank, and sludge formed by skimming flocs from a liquid surface of the tank is subjected to a dewatering process.

27 Claims, 11 Drawing Sheets

SYSTEM AND METHOD FOR REMOVING CONTAMINANTS FROM LIQUID

RELATED APPLICATION

This application claims priority from U.S. Provisional Application Ser. No. 60/300,768, filed Jun. 25, 2001.

BACKGROUND OF THE INVENTION

The present invention generally relates to liquid separation components, systems and methods. More particularly the present invention relates to liquid flotation separation components, systems and methods that employ one or more gasses for separating particulate matter and other contaminants from carrier liquid streams.

It is often necessary to remove contaminants from liquid. For example, the need to remove particles, colloids, solvent and oil from wastewater is desirable in many settings.

Typically, such contaminants are water borne. These streams are typically treated using coagulants and flocculants to form sludge, which is separated from the liquid.

Dissolved air flotation (DAF) systems are often used to separate particulate material from liquids such as wastewater. The systems typically employ the principle that bubbles rising through a liquid attach to and carry away particles suspended in the liquid. As bubbles reach the liquid surface, the attached particles coalesce to form a froth that is collected.

Traditional DAF systems typically introduce small air bubbles into the lower portion of a relatively large tank filled with the liquid to be treated. The air bubbles rise through the liquid and attach to particles in it. The tank includes an outlet through which treated liquid passes at a flow rate consistent with the inlet rate of the liquid plus a fraction for air entrainment.

DAF system processing times and contaminant removal efficiencies typically depend on the residence time of the bubbles in the solution. The residence time, in turn, is affected by bubble size, bubble buoyancy, the depth of the bubbles within the liquid, and the amount of turbulence in the liquid. As footprint increases, the probability increases that particles will contact the bubbles during the residence time available within the tank. In addition, relatively large footprints allow the bubbles sufficient time to rise through the depth to reach the free liquid surface. As a result, traditional DAF systems employ relatively large and costly tanks having correspondingly large "footprints".

The very size of such systems increases the period of time between control adjustment and effect. This is because water going by the adjustment point, for example a polymer inlet upstream of the DAF, requires over half an hour, and usually over an hour, to reach the outlet of the DAF. Thus, there is a substantial delay (i.e. ½ to 1 hour response time) before the effect of the adjustment can be ascertained so as to inform the next adjustment. Thus, these systems lack real-time or even near real-time control. In the event the processing produces a treated effluent stream that is outside operating requirements, the long response time results in production of many gallons of out-of-specification wastewater.

This is especially true under circumstances in which the DAF unit receives flows from several dissimilar processes. This is a common occurrence. Many times the separate flows make up varying fractions of the total flow entering the DAF unit. Floor drains from a canning floor, for example, may carry a fairly small quantity of drained liquid most of the time and large flows during wash downs. Although the normal flow may be similar to the flow from the boiler operation, during wash downs it will exceed the boiler flow. Thus, the character of the composite flow that reaches the DAF can commonly change from one minute to the next. Unless adjustments are made to the DAF process, usually via adjustment of chemical dosages, the contaminant removal efficiency will vary and may degrade below requirements. A need exists for the ability to make real time or near real time adjustments that respond to shifts in the character of the streams to be treated. The large tank size of the typical DAF tank is in part due to the need to flatten these stream variations.

In an effort to reduce the tank size for a DAF system, one proposal disclosed in U.S. Pat. No. 4,022,696 employs a rotating carriage and floc scoop. The carriage directs an inlet solution substantially horizontally along a flow path to increase the path length for bubble travel, and correspondingly increasing the residence time. However, the rotating carriage and scoop create turbulence that slows bubble rise. Unfortunately, while the tank size reduction is set forth as an advantage, the problem with performance tied to residence time still remains.

Another proposal, disclosed in U.S. Pat. No. 5,538,631, seeks to address the turbulence problem by incorporating a plurality of spaced apart and vertically arrayed baffles. The baffles include respective vanes angularly disposed to re-direct the flow of liquid from an inlet positioned at the bottom of the tank. Liquid flowing through the tank deflects upwardly as it traverses the vanes, purportedly reducing the extensity and intensity of turbulence generated near the inlet to the tank.

While this proposal purports to reduce the turbulence problem relating to bubble residence time, the redirected fluid still appears to affect bubbles rising in other areas of the tank, and influences the residence time of such bubbles. Moreover, the proposal fails to address the basic problem of DAF performance being dependent on the need to accomplish bubble-to-particle-adhesion during bubble rise. This increases the residence time needed to complete separation.

In an effort to overcome the limitations in conventional DAF systems, air-sparged hydrocyclones (ASH) have been proposed as a substitute for DAF systems. One form of air-sparged hydrocyclone is disclosed by Miller in U.S. Pat. No. 4,279,743. The device typically utilizes a combination of centrifugal force and air sparging to remove particles from a fluid stream. The stream is fed under pressure into a cylindrical chamber having an inlet configured to direct the fluid stream into a generally spiral path along a porous wall. The angular momentum of the fluid generates a radially directed centrifugal force related to the fluid velocity and indirectly with the radius of the circular path. The porous wall is contained within a gas plenum having gas pressurized to permeate the porous wall and overcome the opposing centrifugal force acting on the fluid.

In operation, the unit receives and discharges the rapidly circulating solution while the air permeates through the porous wall. Air passing through the walls of the porous tube is sheared into the fluid stream by the rapidly moving fluid flow. Micro-bubbles formed from the shearing action combine with the particles or gases in the solution and float them toward the center of the cylinder as a froth in a vortex. The centrally located froth vortex is then captured and exited through a vortex finder disposed at the upper end of the cylinder while the remaining solution exits the bottom of the cylinder.

In operation, however, a substantial portion of the froth tends to become re-entrained on the liquid leaving the hydrocyclone instead of exiting the top. In addition, froth exiting the top usually has a substantial fraction of water that must then be subjected to lengthy dewatering for decanting back into the process upstream of the hydrocyclone.

One variation in the general ASH construction, as described in U.S. Pat. Nos. 4,838,434 and 4,997,549, includes employing a froth pedestal at the bottom of the cylinder to assist directing the froth vortex through the vortex finder. Another ASH modification includes replacing the vortex finder and froth pedestal with a fixed splitter disposed at the bottom of the cylinder and having a cylindrical knife edge. The edge is positioned to split the helically flowing solution into components dependent upon the specific gravity of the components. As above, the ASH systems tend to suffer from relatively large amounts of solution typically remaining in the froth, and significant particle concentrations often remaining in the solution.

Morse, et al, disclosed in U.S. Pat. No. 6,106,711 a system using a hydrocyclone that differs from the above by the absence of a froth pedestal and vortex finder and by the fact that both the froth and the liquid exit the hydrocylone together. In addition, the system relies on a downstream tank with vanes that are slanted from the vertical so as to separate the bubble-particle aggregates from the mass of the liquid stream. Morse, et al, also disclosed in U.S. Pat. No. 6,171,488 a system using a hydrocyclone that differs from U.S. Pat. No. 6,106,711 in that the hydrocyclone makes a submerged entry into the downstream tank.

Although for both of these patents the assembly is small compared to DAF systems, and so provides for near-real-time control, the assembly is a single unit that requires a sizeable location and is large enough to require special equipment to move. It also cannot accommodate the sequential introduction of more than one additive that must be thoroughly mixed with the stream before the introduction of the next additive. For example, it is desirable to adjust pH before adding polymeric flocculants so that high doses of the latter are avoided. In addition, a higher number of extremely fine bubbles would improve flotation. For these Morse inventions, there are not many variables that can be adjusted to optimize performance, so the manufacture of the systems often must be customized to the waste stream to be treated.

In addition, there can be problems scaling up to flows over 100 gallons per minute. At such flows, the momentum of the water is such that bubbles form that are over ½ inch in diameter. These bubbles interfere with flotation by being too large to aggregate with flocs and by creating cavitation, noise and vibration in the piping. In addition, the bubble size distribution begins at 20+ microns and does not bond to the small particles.

Therefore, the prior art has not solved the essential problems of large footprints, process control, flexibility, and small (nanometer) bubble size. Thus, a continuing need exists for a flotation separation system with components that need not be near one another so that space constraints can be accommodated. The need also exists for a method of simply and economically creating large quantities of the optimal size bubble needed at each step of the flocculation and flotation process. The need also exists to be able to easily vary the types and order of additives to minimize doses and interference with downstream additives. An additional need exists for a separation system that reduces the amount of additives needed per unit volume of liquid to be treated, which would reduce ongoing operational costs. The flotation separation system and method of the present invention satisfies these needs and provides other related advantages.

SUMMARY OF THE INVENTION

The fluid conditioning system and method of the present invention provides an efficient and cost-effective way of treating liquids. This is accomplished in part through low cost and small footprint components, including the use of a final separation tank. In addition, advantages are achieved by enabling of in-line mixing of additives into the liquid to be treated in a way in which strategies that cannot be utilized under established designs can be employed.

This is also accomplished in part by minimizing bubble residence time as a factor in flotation system performance. Further, system performance is enhanced by maximizing particle-bubble contact, in part by increasing the number of bubbles of sizes most effective for flocculation and separation. Reduction of the need for residence time allows for smaller flotation components, which in turn significantly reduces floor space and material construction costs. In addition, near real-time process control can be achieved when there is little residence time (and hence response time) between process adjustments. Substantial space flexibility is also achieved through a unique design that allows some components to be physically remote from one another. Substantial reduction in the amount of high cost additives is obtained by sequencing the mixing processes and a unique choice of introduction points.

The present invention generally resides in a method for removing contaminants from a liquid comprising the steps of mixing the liquid to be treated with additives, pressurizing the liquid, dissolving gas into the liquid, thereafter reducing the pressure of the liquid, allowing the dissolved gas to exit the liquid uniformly throughout the homogenous contaminants from the liquid by mixture of liquid and particles and contact the particles continuously while they grow to the most effective contact adhesion size.

The liquid to be treated is initially screened for objects with any dimension greater than the smallest dimension of any aperture in any hydrocyclone component of the invention.

Additives, such as pH adjusting chemicals, reducing agents, polymeric coagulants, flocculants, or absorbers are then mixed with the liquid to be treated. The initial additive mixing step can be accomplished using the following devices or systems:

1. a batch tank equipped with a mixer;
2. a series of hydrocyclones;
3. a flock tube having multiple bends; or
4. in-line mixers.

The gasification step is accomplished by using a gasification device. Preferably a vessel of the device is at least three times as tall as its diameter. Upstream of the gasification device, the liquid to be treated is pressurized. Compressed gas (usually air) is added at a pressure slightly above the liquid line pressure. The liquid enters the vessel through a hydrocyclone head at the top of the vessel. Liquid exits the vessel at or near the bottom. A hydrocyclone accelerator head creates a helical flow around the inside diameter of a barrel forming the exit of the hydrocyclone and passing through the top of the vessel. The barrel extends almost to the bottom of the vessel. Concentric with the barrel is an "uptube" of larger diameter. Liquid flows upward from the bottom of the barrel through the annular space formed between the barrel and the uptube. It exits the uptube near the top of the vessel. The vessel contains a head space above a liquid level. Large bubbles rise immediately to the head space and are not entrained in the liquid as it moves downward toward the vessel exit. In this way, the large bubbles are removed from the liquid passing to the rest of the process. In contrast, small bubbles, those most useful for forming bubble-particle aggregates, do pass into the downstream components. A tube connects the headspace of the vessel to the top of the hydrocyclone. The liquid leaving the exit near the bottom of the vessel contains more gas than at the inlet, and most of the gas is dissolved.

Additives, typically anionic flocculants, can be added to the liquid after the dissolving, gasification step.

The next step of the invention is forcing of the liquid through at least one pressure drop. This controls bubble formation and matches bubble rise to the task at hand. This may be accomplished using either an orifice plate or a hydrocyclone.

The final step is separation by stratification, preferably in a multi-chamber tank that takes advantage of flotation forces in a specific way. The liquid from the pressure drop device enters near the bottom of the tank preferably opposite the sludge exit port of the tank. The bottom entrance directed toward the top operates to reduce the turbulence from the pressure drop and provide time for additive-based chemical reactions to occur. In some applications, the first chamber is equipped with a baffle to enhance conversion from chaotic flow into more linear upward flow.

The primary path of the liquid is horizontally across the top of the tank. As the liquid travels from the entrance end of the tank, the flocs float to the surface and are removed by a mechanical skimmer that pushes them onto a beach and into sludge handling equipment. When the liquid reaches the far wall in its traverse across the top of the tank, it flows primarily downward and circulates back toward the first chamber. At the bottom of the second chamber and substantially adjacent to the first chamber is one or more outlets for the treated liquid. The approach to the outlet is baffled in a way that accomplishes deflection of the circulating current upward and maintains a density layer separation insuring the cleanest portion of the liquid exits the tank. Water level in the tank is maintained by any suitable means, for example, by using a weir. Cleaned water flows out of the flotation tank below the water level to its next use or to disposal.

The liquid conditioning method and system of the present invention provides for in-line managed mixing that adds and sequences initial additives to adjust the characteristics of the liquid to optimize flocculation and separation; provides for addition of gas in a way that evenly and finely distributes the gas within the liquid being treated, even at flows higher than 100 gpm, reduces the pressure in a manner which causes formation of bubbles of the size most needed at each point in the process; provides for rapid separation and consolidation of the bubble-particle aggregates; and produces sludge with superior separability and handling characteristics and enables near-real-time process control.

Other features and advantages of the present invention will be apparent from the following detailed description when read in conjunction with the accompanying drawings.

BRIEF DESCRIPTION OF THE DRAWINGS

The accompanying drawings illustrate the invention. In such drawings

DETAILED DESCRIPTION OF THE PREFERRED EMBODIMENTS

Figure 1A:
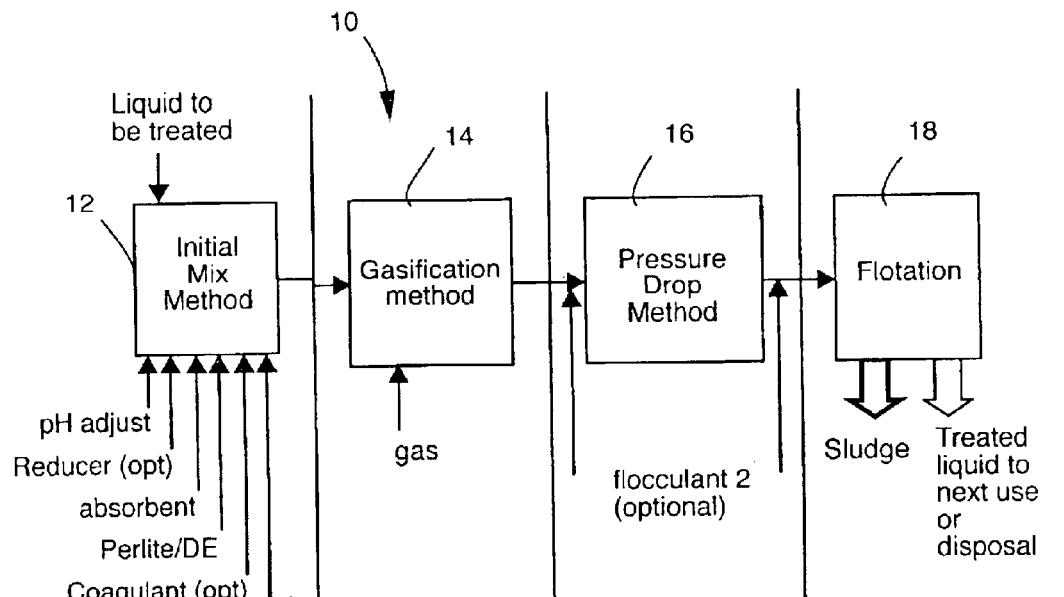
FIGS. 1A and 1B are block diagrams of the liquid contaminant removal method and related systems of the invention.

As shown in the drawings for purposes of illustration, the present invention resides in a method and system, generally referred to by the reference number 10, which removes contaminants from a liquid so as to treat the liquid for disposal or subsequent use. With reference to FIG. 1A, the method of the present invention generally comprises filtering or screening objects from the liquid having a relatively large dimension with respect to the apertures and tubes within the system of the present invention. The liquid to be treated is then mixed with various additives 12, as will be more fully described below. The mixed liquid is then pressurized and gasified 14 to dissolve gas into the liquid. The pressurized liquid then experiences a pressure drop 16 which causes bubbles of gas within the liquid to expand and floccules to aggregate and associate with the bubbles. The contaminants are then separated from the liquid by a floatation and stratification process 18.

Figure 1B:
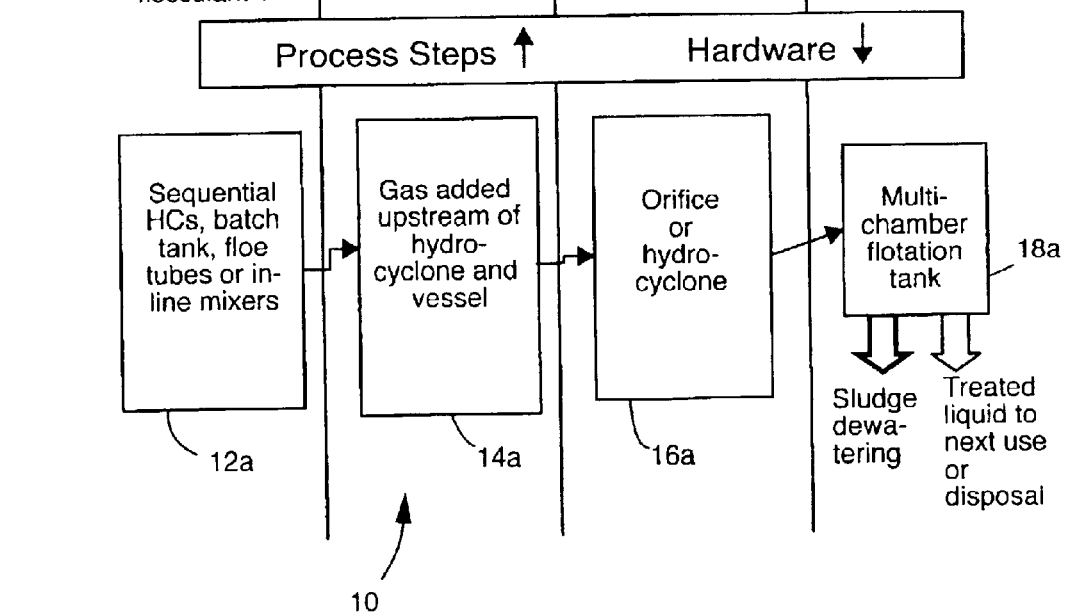

Referring to FIG. 1B, the invention consists of the following components or subsystems, each of which is novel and innovative in its own right: a mixing system 12a, as will be more fully disclosed below, for introducing a sequence of additives, a gasification device 14a for adding gas to the liquid, a pressure drop device 16a for creating the bubbles required, and a separation tank 18a for harvesting the cleaned liquid. All components are composed of materials resistant to degradation by constituents of the liquid to be treated, the additives, or any reaction product thereof.

A. Initial Additive Mixing Step:

To remove particulate and other suspended contaminants from liquids, it is frequently necessary to mix into the liquid to be treated substances that cause contaminants to aggregate. The choice of additives and the order in which they are added is tailored to the liquid to be treated. However, the invention uses the following methods for determining the identity and order of additives.

Liquids containing contaminants frequently have a pH that must be adjusted to make efficient use of coagulants and flocculants. Accordingly, the pH of the liquid to be treated is adjusted before introduction of such additives to minimize the quantity of such additives needed. If the pH of the liquid is not optimal to take advantage of the isoelectric point, the pH is adjusted by adding an acid or a base. The dosage necessary to achieve a given pH adjustment may be determined in any well-known manner.

If substantial chlorine is present in the liquid to be treated, a reducing agent such as $NaHSO_3$ is mixed in before introduction of polymeric coagulants and flocculants. Chlorine may otherwise reduce the effectiveness of the polymeric additives and necessitate higher doses.

If petroleum compounds are present, the next additive is a powdered absorbent such as bentonite clay. Solvents and oils will tend to be absorbed by the clay, especially if they are hydrophobic. In this way, these non-particulate suspended contaminants are converted to particles that can be flocculated and separated. Preferably, a porous, lightweight, hydrophilic material with particle diameter less than 100 microns and a high surface area to volume ratio (e.g. expanded perlite) is added also. Preferably, the clay and perlite-like-substance are mixed with the same water. The combination tends to keep the perlite in suspension.

Next, if the liquid to be treated is responsive to coagulants as determined through standard "jar testing", a coagulant is added. Alternatively, in many cases coagulant will not be necessary using this system.

Lastly, one or more flocculants can be optionally added. In many cases, two flocculants are added, a cationic flocculant and an anionic flocculant. In many cases, it is preferable to mix in the cationic flocculant immediately after mixing in the coagulant. In some cases, reduced flocculant consumption can be achieved by dividing the dose of cationic flocculant and adding it in discreet doses before the gasification step. Preferably, the anionic flocculant is added after the gasification process and immediately before the pressure is reduced. Alternatively, anionic flocculant is not always necessary. Also, alternatively, cationic flocculant is most beneficial when added after gasification for certain streams, such as those containing protein.

Figure 2:
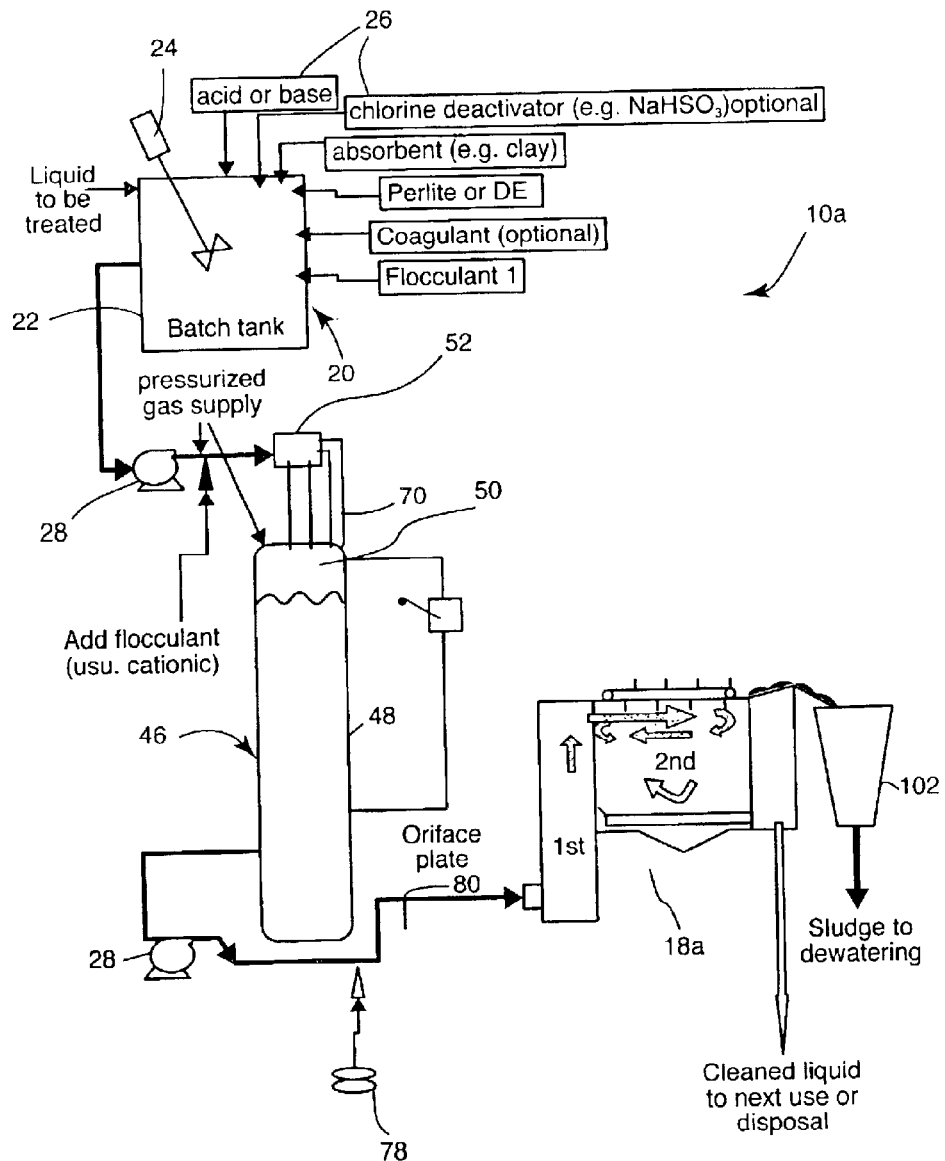
FIG. 2 is a component diagram of the form of the invention utilizing a batch tank for mixing initial additives, a gasification vessel, and an orifice as a pressure drop.

Referring now to FIG. 2, a batch tank embodiment 10a for additive mixing is disclosed. Mixing by batch tank 20 uses a container 22 equipped with any suitable mixer 24. Additives 26 are prepared and added according to the characteristics of the liquid to be treated, as described above. Addition of additives to the batch tank 20 can be automated using any suitable dosing system. If continuous processing is desired, two batch tanks can be used so that the process is fed from one while additives are mixed into the other.

Figure 3:
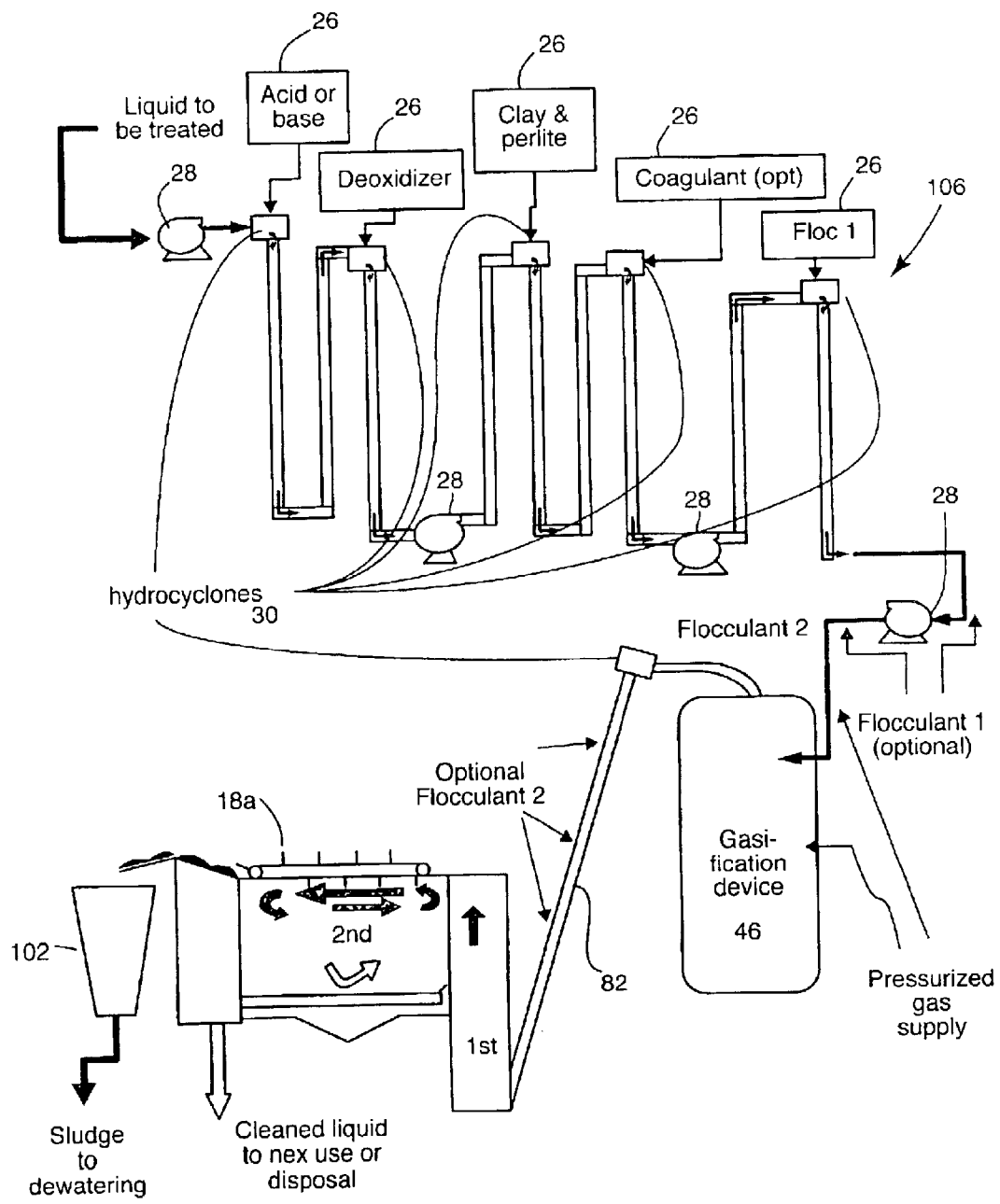
FIG. 3 is a component diagram of the form of the invention utilizing hydrocyclones for mixing additives, and a hydrocyclone as a pressure drop.

Referring now to FIG. 3, a hydrocyclone-based mixing system 10b is disclosed. In this subsystem of the invention, the liquid is fed by a booster pump 28 through a series of hydrocyclones 30. One or more additives 26 are added at each hydrocyclone 30. In some cases, compatible additives 26 may be added to a single hydrocyclone 30. Usually, a booster pump 28 is needed after every two hydrocyclones 30 to restore liquid pressure to between 20 and 80 psi at the inlet of the next hydrocyclone 30.

Figure 4:
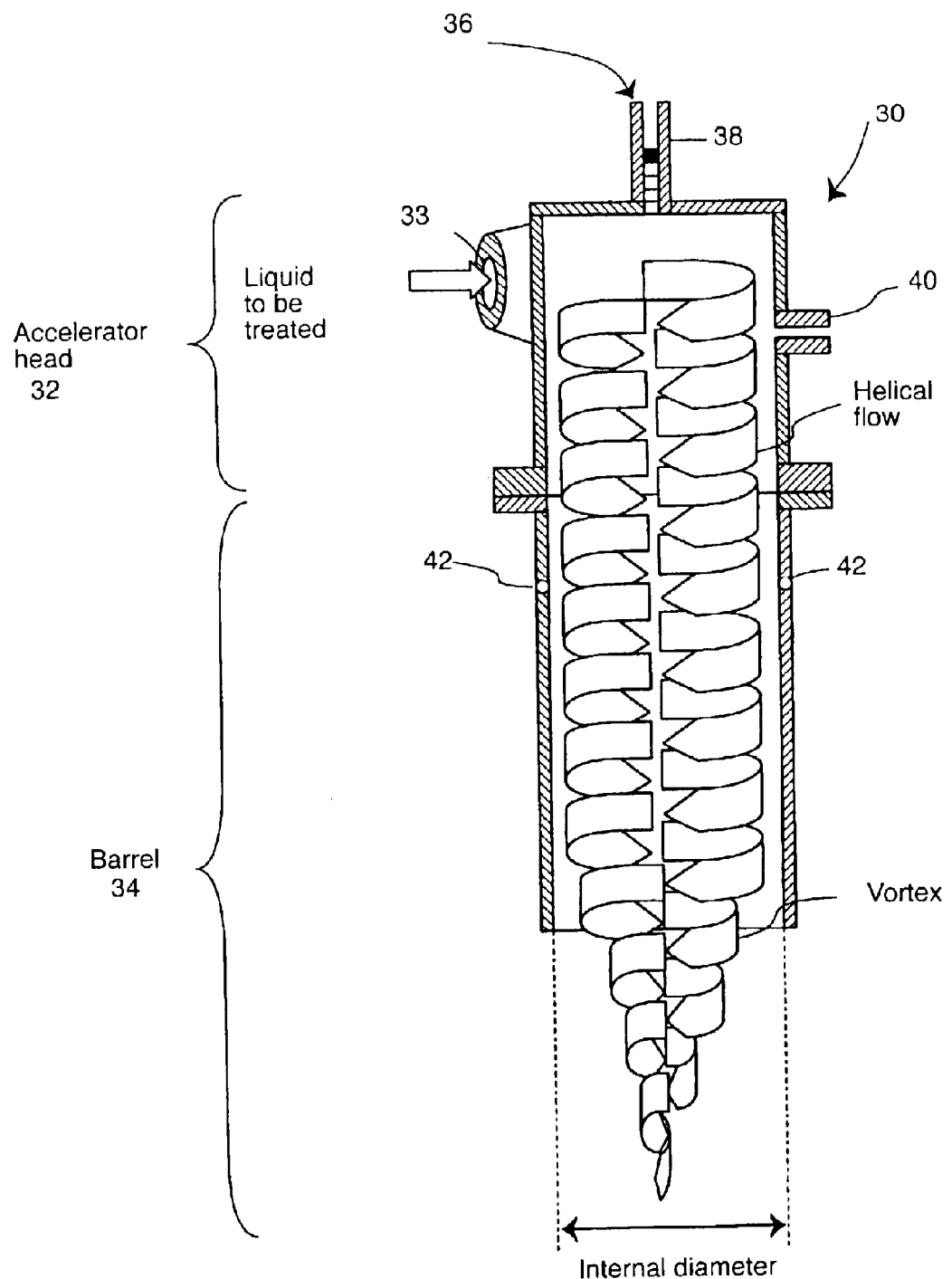
FIG. 4 is an axial cross-sectional view of a hydrocyclone utilized in accordance with the present invention.

Referring now to FIG. 4, each hydrocyclone 30 is comprised of an accelerator head 32 coupled at its outlet to a barrel 34. Liquid to be treated is fed under pressure into the accelerator head 22 through an inlet 33 in an orientation substantially tangential to its interior wall. The liquid is thereby forced into a substantially helical path along the inside wall of the head 32 and flows into the barrel 34. For hydrocyclones 30 between one inch and six inches in diameter, the length of the barrel 34 should be at least approximately 24 inches, the distance necessary for the standard pipe velocity profile to be reestablished prior to entry into the next hydrocyclone 30. This will depend on the feed pressure of the liquid to the hydrocyclone 30 and the volume throughput (gpm) of the system 10b.

The accelerator head 32 may be closed to atmosphere, or, preferably, equipped with a device 36 that opens when the vacuum within the air space of the head 32 reaches a predetermined value. For example, a spring-loaded valve 38 may be configured to lift from its seat when the pressure inside the head 32 is sufficiently below atmospheric to benefit from additional air. In this way, the layer of liquid swirling on the interior walls is kept sufficiently thin to optimize mixing.

Figure 9:
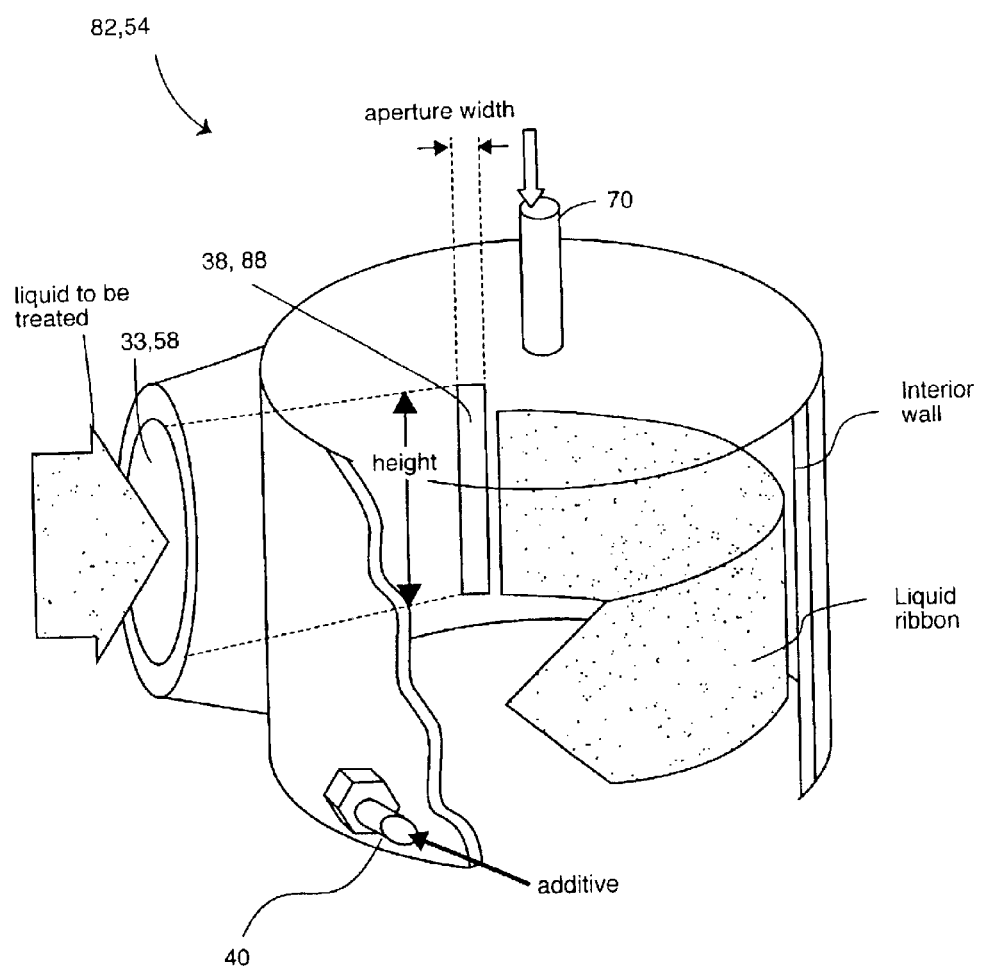
FIG. 9 is a perspective cutaway view of an accelerator head of the hydrocyclone of FIG. 8.

The accelerator head 32 is equipped with one or more inlets 40 for introduction of liquid or gaseous additives into the liquid flow. An inlet 40 may be located in the top of the head 32. Inlets 40 may also be oriented through the wall of the head so as to introduce additives substantially tangentially to the flow of the liquid to be treated, as shown in FIG. 9. Alternatively, the inlets 40 in the wall may be oriented radially to the axis of the head, as shown in FIG. 4. The barrel 34 may also have wall inlets 42 in these orientations. If there is a need for multiple inlets 42 in the barrel 34, a collar (not shown) equipped with inlets may be used. The collar has the same internal diameter as the head 32 and the barrel 34. It is shorter than the barrel 34 and contains inlets in either tangential or radial orientations as already described.

Figure 5:
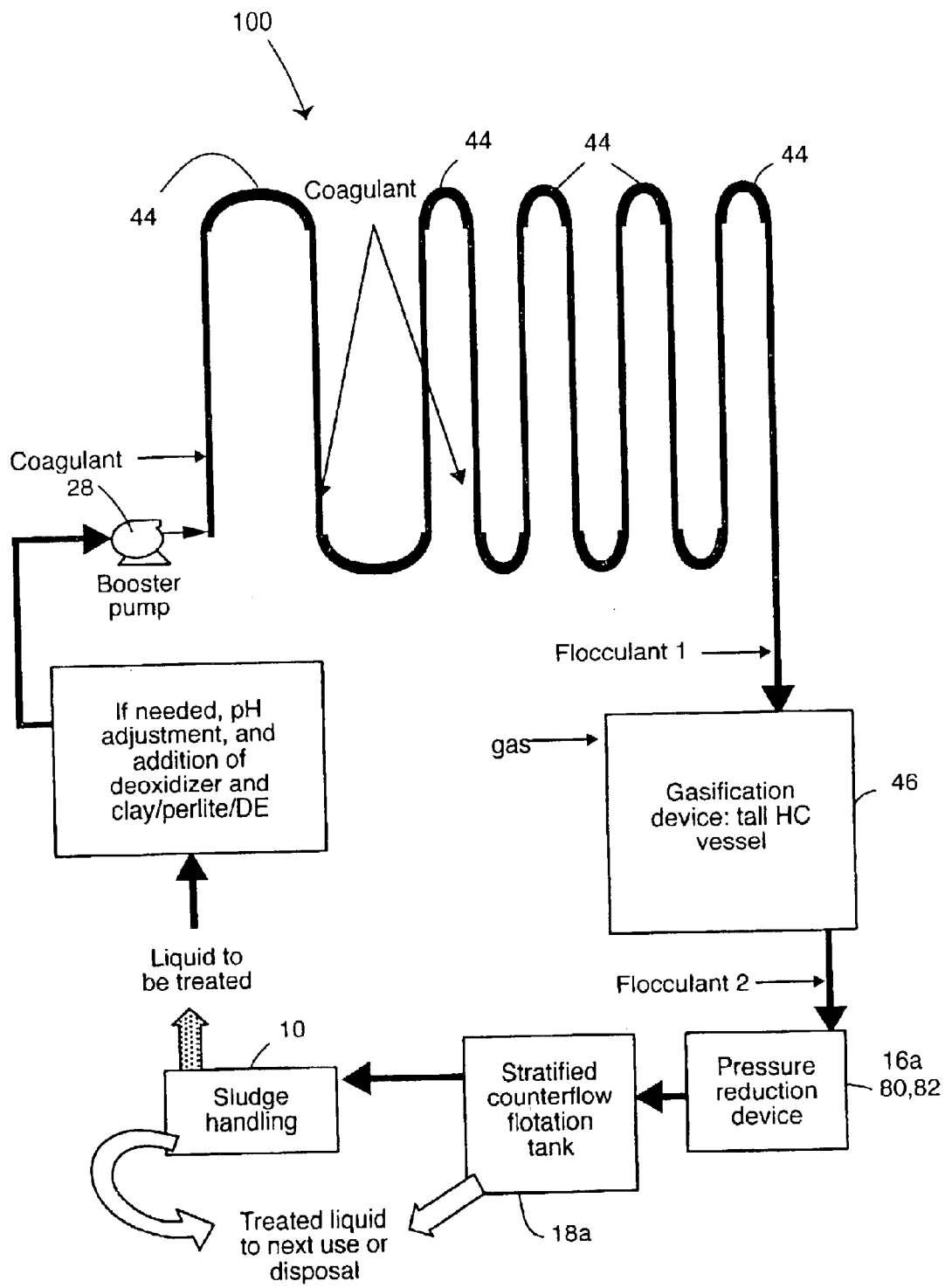
FIG. 5 is a component diagram of the form of the invention utilizing a bent floc tube for mixing additives, a gasification device, and a pressure drop device.

Referring now to FIG. 5, a floc tube system 10c may be used to accomplish mixing. This established method uses approximately six floc tubes 44 having 90 degree bends to mix each additive. Additives are prepared and dosed according to the characteristics of the liquid to be treated. Addition of additives can be automated using any suitable dosing system.

Some streams are suitable for use of in-line mixers (not shown), an additional established method. Additives are prepared and dosed according to the characteristics of the liquid to be treated. Once again, addition of additives to the mixers can be automated using any suitable dosing system.

B. The Gasification Step:

The gasification step 14 is accomplished using a hydrocyclone-equipped device 46. If necessary, a booster pump 28 may be added between the additive addition step and the gasification device 46.

Referring to FIGS. 2, 3 and 5, the gasification device 46 defined by an outer vessel 48 with an inlet at the top for entry of the liquid to be treated. Upstream of the gasification device 46, the liquid to be treated is pressurized. Compressed gas (usually air) is added at a pressure slightly above the liquid line pressure. The vessel 48 is at least three times as tall as its diameter, and the liquid exits the vessel 48 at or near the bottom. The vessel 48 contains the liquid to be treated and a head space 50 above the surface of the liquid. The capacity of the vessel 48 is between 5 seconds and 3 minutes of flow.

Figure 6:
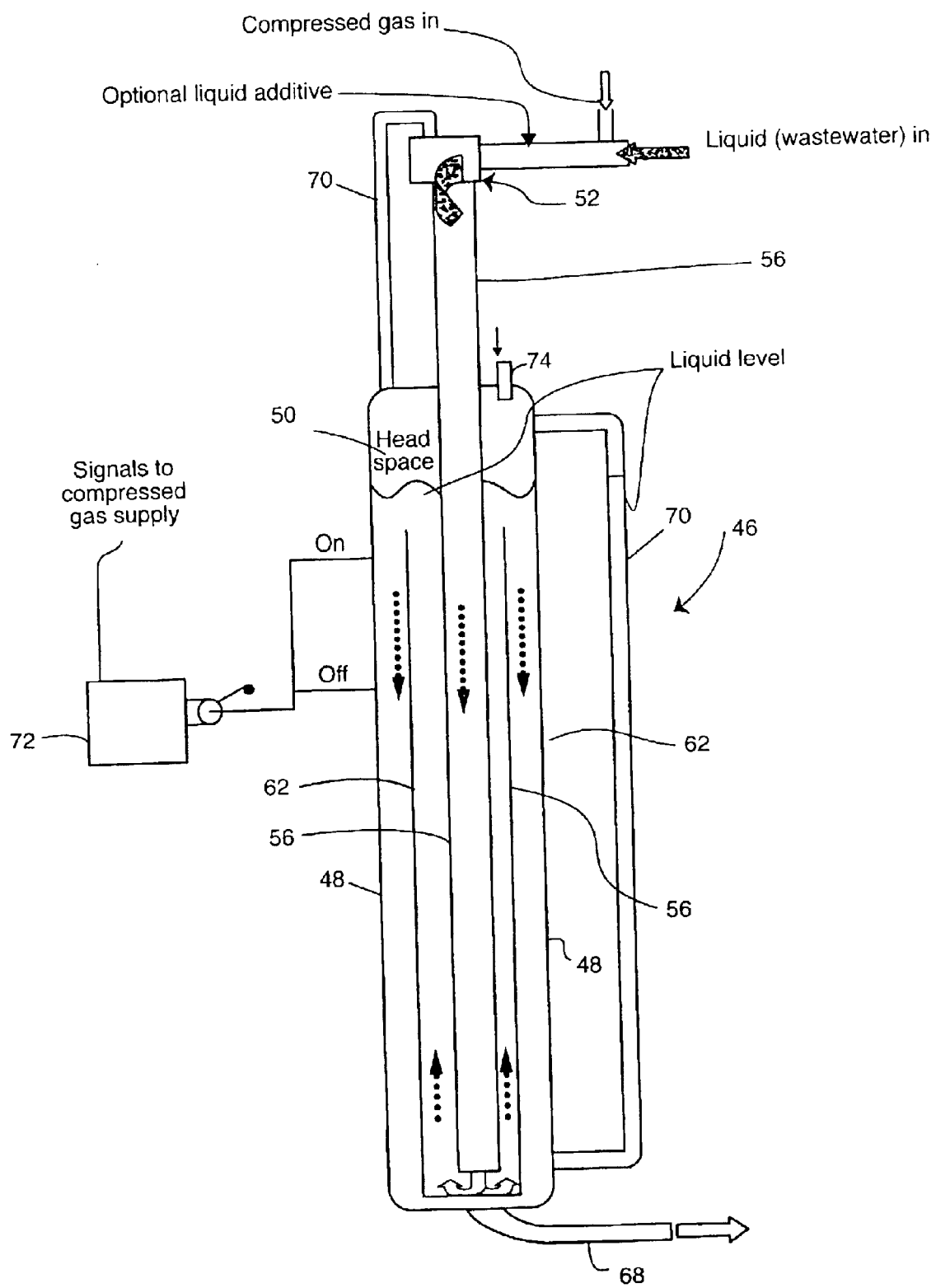
FIG. 6 is a vertical cross-sectional view of the gasification device used in accordance with the present invention.
Figure 7:
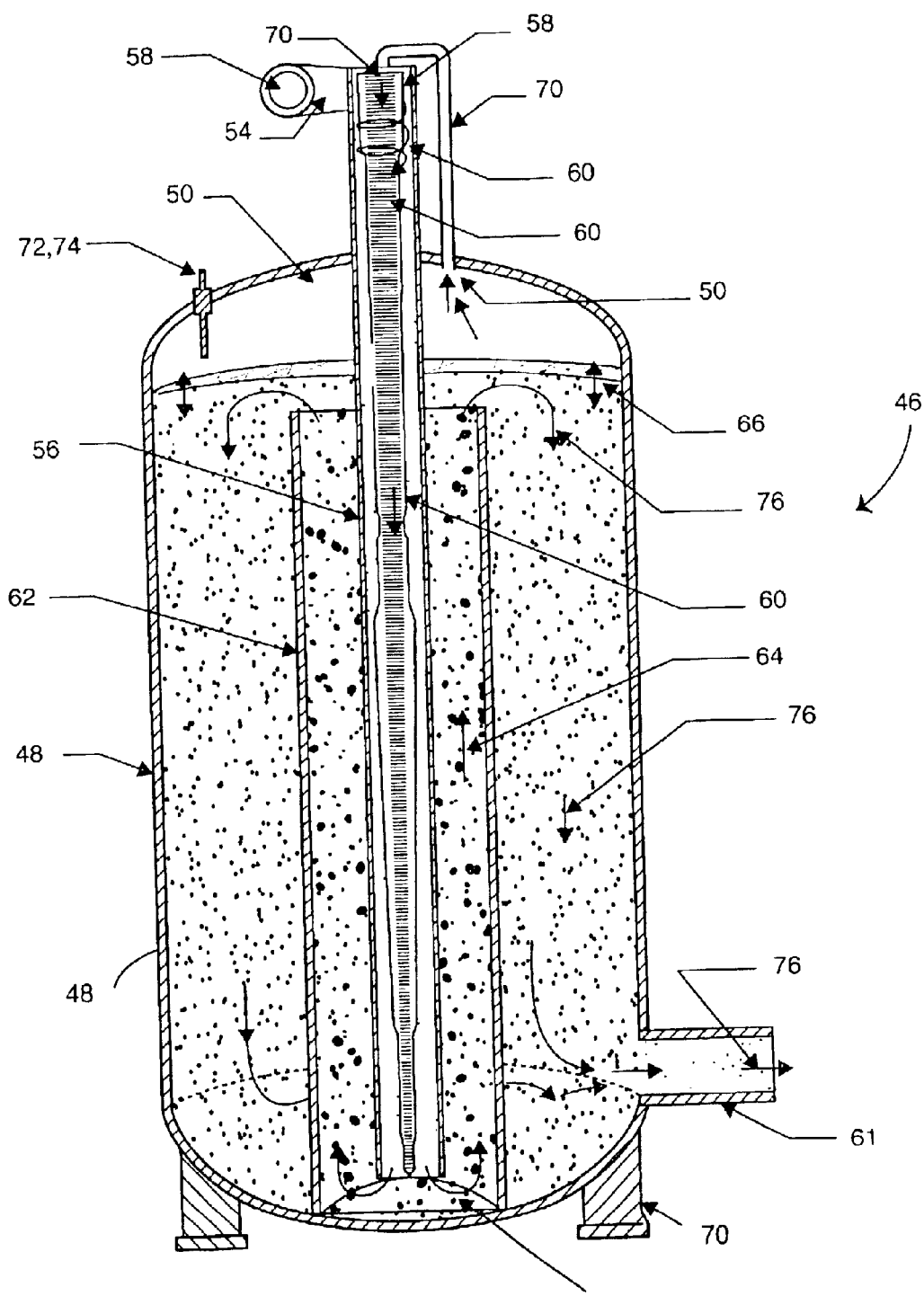
FIG. 7 is a detailed vertical cross-sectional view of the gasification device of the present invention.
Figure 8:
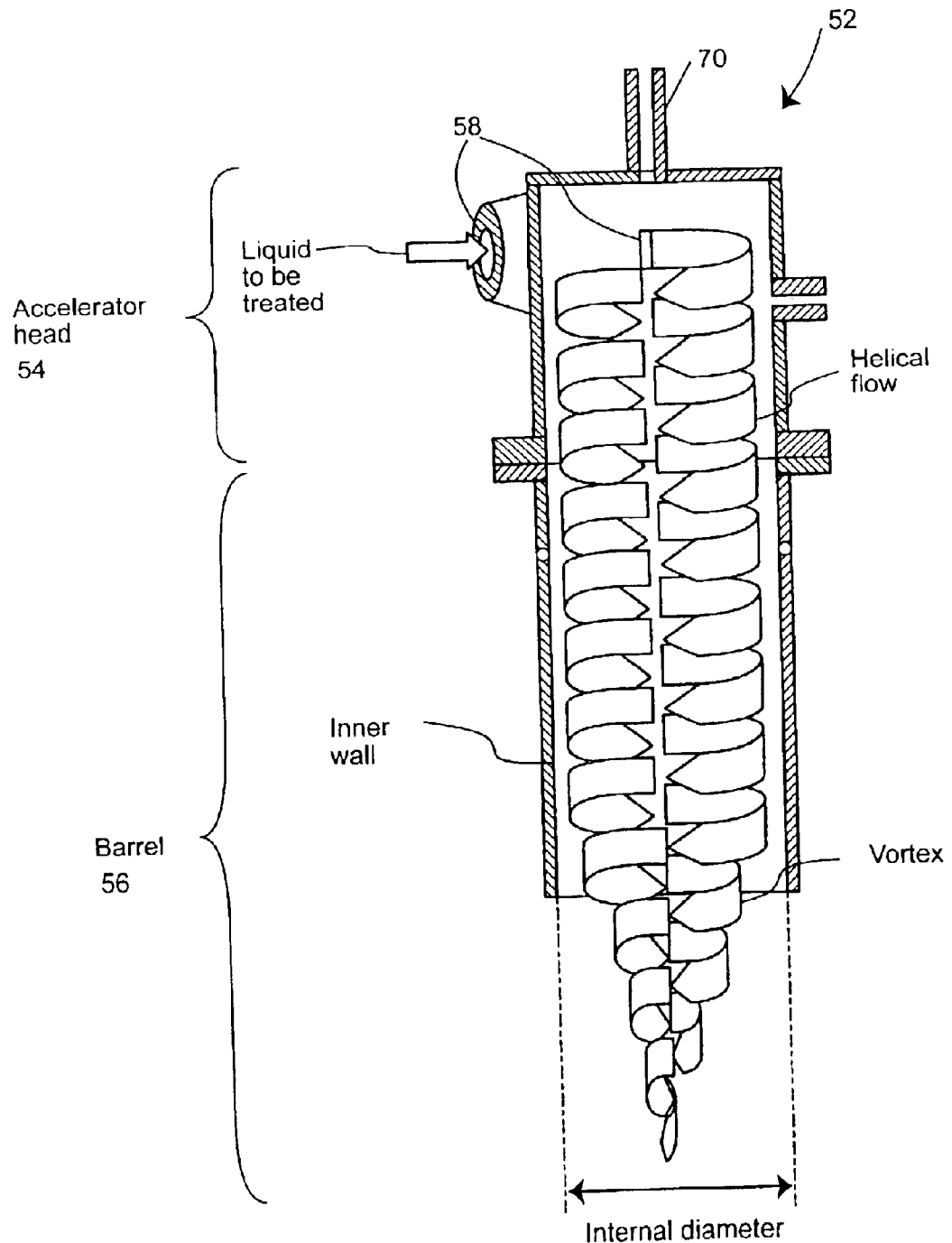
FIG. 8 is an axial cross-sectional view of a hydrocyclone component of the gasification device.

With particular reference now to FIGS. 6–8, the inlet of the gasification device 46 is a hydrocyclone 52 composed of an accelerator head 54 and a barrel 56 of substantially equal and constant internal diameter. The barrel 56 is preferably between 30 and 100 diameters long. The liquid to be treated is forced into the vessel 48 through an inlet 58, the accelerator head 54, which creates a substantially helical flow 60 around the inside wall of the head and the barrel 56 coupled to it.

Referring again to FIGS. 6 and 7, the barrel 56 of the hydrocyclone 52 is positioned to enter the top of the vessel 48. The barrel 56 extends almost to the bottom of the vessel 48. Concentric with the barrel 56 is an "uptube" or baffle 62 of larger diameter. Liquid flows upward from the bottom of the barrel 56 through the annular space 64 formed between the barrel 56 and the uptube 62. The liquid exits the uptube 62 near the top of the vessel 48. Large bubbles 66 rise immediately to the head space 50 and are not entrained in the liquid as it moves downward toward the vessel exit 68. In this way, the large bubbles 66 are removed from the liquid passing to the rest of the process. Large bubbles reduce the effectiveness of the downstream devices. In contrast, small bubbles 76, those most useful for forming bubble-particle aggregates, do pass into the downstream components. A tube 70 connects the headspace 50 of the vessel 48 to the top of the hydrocyclone 52. The pipe 70 that allows gas that enters the headspace 50 from the liquid to be reused to gasify the liquid.

The liquid leaving the exit 68 near the bottom of the vessel 48 contains more gas than at the inlet 58, and most of the gas is dissolved. While the liquid is maintained at pressure over 20 psi, the gas remains dissolved.

The height of the head space 50 is between 1 and 50 inlet hydrocyclone diameters. To maintain the position of the liquid level, the flow of the compressed gas supply to the headspace is adjusted. The vessel may be equipped with an automated level sensor 72 that provides a signal to control a valve 74 regulating the supply of compressed gas.

An alternative for the coagulation and gasification steps employs electrolysis (not shown). The liquid is passed through the annular space between an electrically conductive tube and an insulating coaxial tube or bar. The conductive tube is the outer tube. In the annular space is a metal coil. The coil is not rigid, but is designed not to come in contact with the outer tube. The outer tube and metal coil are preferably the cathode and anode, respectively, although the polarity may be reversed in some applications. A voltage is set up across the coil and the outer tube. The liquid to be treated is passed through the annular space. In this way, it flows over the coil and is subjected to an electrical field. Coagulation, especially of proteins, occurs without prior pH adjustment and flocculation can be accomplished with approximately one third the dose of flocculant. In addition, the energized coil vibrates and thereby resists fouling, a prime disadvantage of the electrocoagulation of prior art.

C. Addition of Late Stage Additives

Referring back to FIGS. 1–5, the third step of the invention is addition of late stage additives, for example, a polymeric flocculant, usually an anionic flocculant. This is accomplished using any pump 78 and fitting suitable to the liquid additive, for example, a positive displacement pump for viscous polymeric flocculants.

D. Pressure Drop Step

The fourth step of the invention is forcing of the liquid through at least one pressure drop. The invention releases the gas dissolved within the liquid, initially in the form of small bubbles. It is known that small bubbles attach most readily to particles. Further, the size of the bubbles produced by the pressure drop component can be controlled to apply the size most needed at each step of the flotation process. This is accomplished by adjusting the pressure on the liquid upstream of the pressure drop device 16a.

The invention may employ either a orifice 80 or a hydrocyclone 82 to drop the pressure. When the liquid and the freshly introduced anionic polymer pass through the pressure drop device 16a, floccules form and increase in size. Simultaneously, gas flashes and forms small bubbles. The bubbles attach to particles and flocs in the liquid.

Referring now to FIG. 2, the orifice option for achieving the desired effect is disclosed. The pressure drop device preferably utilizes a single orifice plate 80. Control is achieved by varying the pressure developed by the pump 28, 78 upstream of the gasification device 46. The ratio between the diameters of the orifice and the pipe is irrelevant.

Surprisingly it has been found that the use of such a high shear passage does not degrade the performance of high molecular weight polymeric flocculants. This is the opposite of what would be expected from established teachings in the state of the art that high shear environments degrade the effectiveness of such additives. For example, for an industrial laundry stream, treatment using the orifice disclosed herein consumed less than half of the cationic flocculant predicted by jar testing even though the cationic flocculant and its partially formed flocs were passed through a minimum of two hydrocyclones 30, a pump 28 and an orifice plate 80.

Referring now to FIG. 3, the second option for achieving the desired pressure drop effect is shown using a hydrocyclone 82. This hydrocyclone 82 fits the description of the hydrocyclone(s) 30 described above, except that the barrel length is usually longer.

E. Separation by Stratification:

Referring to FIGS. 1–3, and 5, the fifth step, separation by stratification, primarily through flotation, is disclosed. This step is preferably accomplished using a tank 18a configured to slow and diffuse the flow of liquid and allow flocs to rise rapidly to the surface and accumulate. The tank 18a is downstream of the pressure drop device 16a and is referred to herein as the flotation tank.

Figure 10:
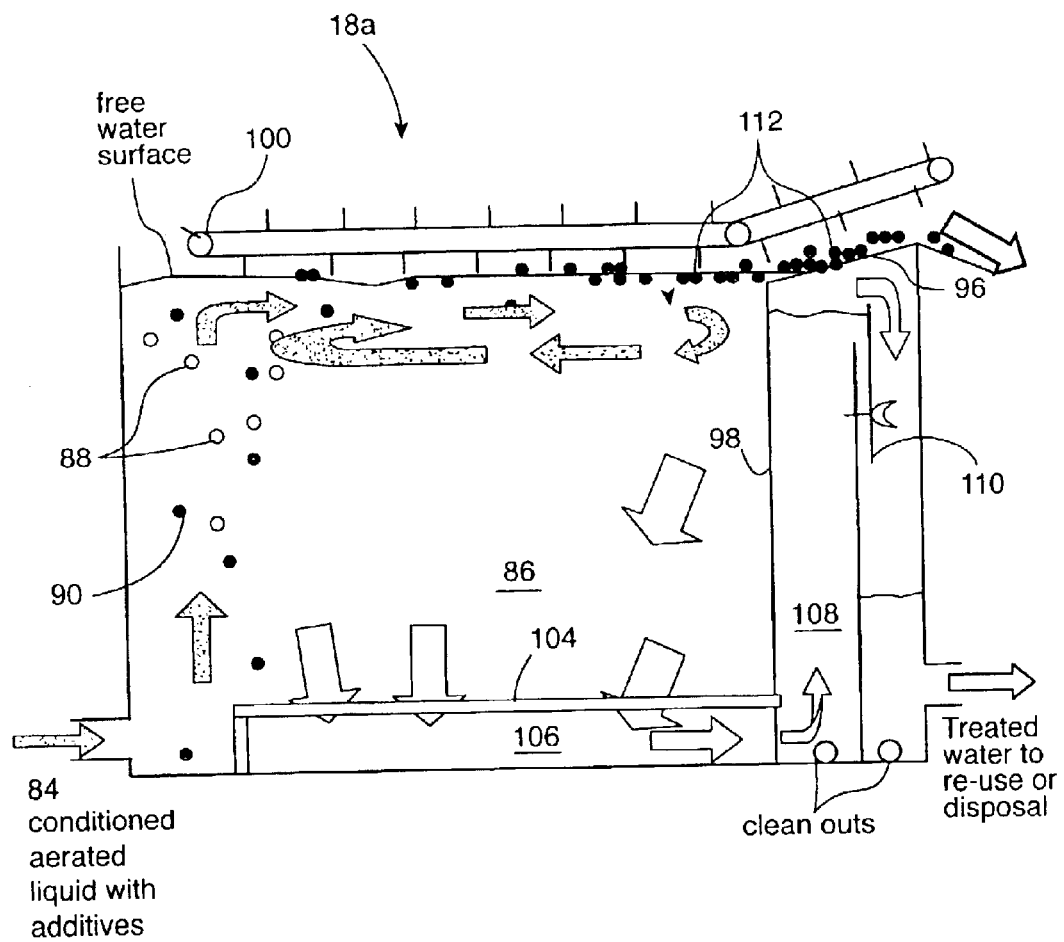
FIG. 10 is vertical cross-sectional view of a flotation separation tank of the present invention.
Figure 11:
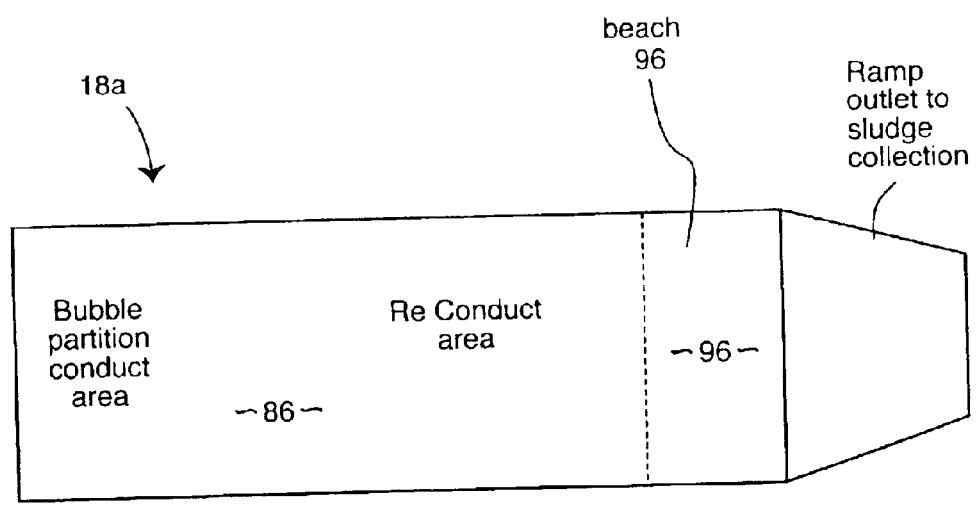
FIG. 11 is a top plan view of the flotation tank.

Referring now to FIGS. 10 and 11, the flotation tank 18a is preferably a multi-chamber container that takes advantage of flotation forces in a specific way. The tank 18a is equipped with an entry 84 for the liquid from the pressure drop device 16a (FIGS. 1B and 5). The entry 84 is near the bottom of a first chamber 86 of the flotation tank 18a. The first chamber 86 has a cross section of area at least ten times that of the feed pipe 84. Accordingly, the liquid slows. In the process, the kinetic energy in the liquid is reduced, pressure drops further, small bubbles 88 expand, flocs 90 continue to form and flocs are buoyed more effectively by the additional and larger bubbles. The flow "blooms" in the first chamber 86 and rises through it with the flow of the liquid. The first chamber 86 is optionally equipped with a baffle or diffuser (not shown) to convert the kinetic energy from passage through the orifice 84 into more laminar upward flow. In this relatively quiescent upper portion of the first chamber, bubble-particle agglomerations become fully formed and robust.

The flocs 90 float to the surface and are swept toward a beach 96 located at the far wall 98 of the first chamber 86. As the liquid flows across the first chamber 86, it propels flocs 90 rising and already at the surface toward the beach 96. In addition, a mechanical skimmer 100 pushes accumulated flocs onto a beach 96 and into sludge handling equipment 102 (FIG. 2). When the liquid reaches the far wall 98 in its traverse across the top of the chamber 86, it has deposited the vast majority of its flocs 90 and contaminants at the free surface.

The liquid bubble mixture then circulates back, wherein the water turning downward carries particles with insufficient buoyancy to overcome the horizontal velocity of the top layer of liquid across the chamber 86. Thus, these particles remain entrained in the liquid bubble mixture. The flow splits into two main paths at this point, one remaining in a shallow layer (arrows with fine dotted fill pattern in FIG. 10) beneath the outward flowing layer, and a second flow (arrows with clear fill pattern in FIG. 10) deeper into the chamber 86. The backflowing portion of the shallow layer moves faster and substantially perpendicular to the deeper backflow and transports the particles with inadequate buoyancy back to the area at the top of the first chamber 86. This area is populated by rising bubbles 88 and flocs 90. Particles swept into this area attach to bubbles 88, increase their buoyancy, and are swept outward again toward the far wall 98 of the chamber 86 in the top layer. If their buoyancy is adequate, they are captured by the surface tension of the free surface. If not, they are recirculated indefinitely for additional exposure to bubbles 88 that will eventually carry them to the surface.

At the bottom of the chamber 86 is a perforated plate 104 that distributes the flow of clean water uniformly into an intermediate chamber 106. Evacuation of the clean portion of the liquid in the chamber 86 is accomplished by drawing off the bottom of the tank 18a as far out of the path of the semi-buoyant particles as possible. The intermediate chamber is in fluid communication with an inlet to a second chamber 108.

Preferably, the residence time in the first chamber 86 is between 1 and 4 minutes.

From the intermediate chamber 106, the treated liquid flows into a final or second chamber 108. The liquid rises through the final chamber 108. The liquid level in the final chamber 108 is controlled using any suitable means, such as an adjustable weir 110. The water in the final chamber 108 is directed using any suitable means to its next use or to disposal.

From the beach 96, the invention directs sludge 112 to a dewatering system 102. The water that separates from the sludge 112 can be recirculated back into the system. Sludge 112 produced using this method dewaters rapidly.

It will be understood by those having skill in the art that the present invention constitutes a flotation process adjustable in real time. The entire stream is loaded with dissolved gas for later controlled release to float solids. The present invention may be used in connection with an existing treatment liquid treatment system. Alternatively, the invention may be incorporated into an entirely new liquid treatment system. Of particular significance is the capability of retrofitting existing treatment systems to become more efficient in removing contaminants from liquids, while at the same time requiring few modifications to the existing system. Additionally, by introducing rapid bubble-particle formation, flotation can be used to remove contaminants. The novel and unobvious use of shapes and surfaces makes the invention one in which the only moving parts are the pumps, gas compressor, mechanical skimmer, and vacuum relief valve.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A method for removing contaminants from a liquid, comprising the steps of:
   mixing the liquid to be treated with additives, wherein the mixing step comprises directing the liquid through a series of hydrocyclones and adding one or more additives at each hydrocyclone;
   pressurizing the liquid;
   dissolving gas into the liquid;
   reducing the pressure of the liquid, allowing the released gas bubbles to co-mingle with the homogenous mixture as they form; and
   separating the contaminants from the liquid by stratification.

2. The method of claim 1, including the step of filtering contaminant objects larger than a predetermined size from the liquid.

3. The method of claim 1, including the step of adding additives to the liquid after the dissolving step.

4. The method of claim 1, wherein the additives comprise at least one of a pH adjusting chemical, a reducing agent, a polymeric coagulant, a flocculant, and an absorbent.

5. The method of claim 1, wherein the mixing step comprises the utilization of a batch tank equipped with a mixer.

6. A method for removing contaminants from a liquid, comprising the steps of:
   mixing the liquid to be treated with additives;
   pressurizing the liquid;
   dissolving gas into the liquid;
   reducing the pressure of the liquid, allowing the released gas bubbles to co-mingle with the homogenous mixture as they form; and
   separating the contaminants from the liquid by stratification;
   wherein the dissolving step comprises directing the liquid through a gasification device, the dissolving step further comprising introducing the liquid an inlet of a hydrocyclone of the gasification device, directing the liquid exiting the hydrocyclone upwards to a liquid surface layer to remove large bubbles, and removing liquid containing dissolved gas from a bottom portion of a vessel of the gasification device.

7. The method of claim 1, wherein the mixing step comprises directing the liquid through a floc tube having multiple bends and adding one or more additives.

8. The method of claim 1, wherein the mixing step comprises directing the liquid through in-line mixers and adding one or more additives.

9. The method of claim 1, wherein the dissolving step comprises directing the liquid through a gasification device.

10. The method of claim 9, wherein the dissolving step further comprises introducing the liquid into an inlet of a hydrocyclone of the gasification device, directing the liquid exiting the hydrocyclone upwards to a liquid surface layer to remove large bubbles, and removing liquid containing dissolved gas from a bottom portion of a vessel of the gasification device.

11. The method of claim 1, wherein the lowering pressure step comprises forcing the liquid through an orifice plate.

12. The method of claim 1, wherein the lowering pressure step comprises forcing the liquid through a hydrocyclone.

13. The method of claim 1, wherein the separating step comprises introducing the liquid into a separation tank.

14. The method of claim 13, wherein the separation step further comprises introducing the liquid at the bottom so as to slow the flow of the liquid and cause the liquid to rise, cause small bubbles to expand, and create flocs.

15. The method of claim 14, including the step of directing the treated liquid into a second chamber having an adjustable weir and draining the treated fluid from the third chamber.

16. The method of claim 14, including the step of directing sludge formed by the skimmed flocs to a dewatering system.

17. The method of claim 1, wherein the pressurizing step comprises introducing pressurized gas into the liquid stream.

18. A method for removing contaminants from a liquid, comprising the steps of:
   mixing the liquid to be treated with additives;

pressurizing the liquid by introducing pressurized gas into the liquid stream;

dissolving gas into the liquid by introducing the liquid into an inlet of a hydrocyclone of a gasification device, directing the liquid exiting the hydrocyclone upwards to a liquid surface layer to remove large bubbles, and removing liquid containing dissolved gas from a bottom portion of a vessel of the gasification device;

reducing the pressure of the liquid; and separating the contaminants from the liquid utilizing a multi-chambered stratification separation tank.

19. The method of claim 18, including the step of filtering contaminant objects larger than a predetermined size from the liquid.

20. The method of claim 18, including the step of adding additives to the liquid after the dissolving step.

21. The method of claim 18, wherein the additives comprise at least one of a pH adjusting chemical, a reducing agent, a polymeric coagulant, a flocculant, and an absorbent.

22. The method of claim 18, wherein the mixing step comprises the utilization of a batch tank equipped with a mixer, directing the liquid through a series of hydrocyclones and adding one or more additives at each hydrocyclone, directing the liquid through a floc tube having multiple bends and adding one or more additives, or directing the liquid through in-line mixers and adding one or more additives.

23. The method of claim 18, wherein the lowering pressure step comprises forcing the liquid through an orifice plate or forcing the liquid through a hydrocyclone.

24. The method of claim 18, wherein the separation step further comprises:

introducing the liquid at the bottom of the tank so as to slow the flow of the liquid and cause the liquid to rise, cause small bubbles to expand, and create flocs;

directing the treated liquid into a second chamber having an adjustable weir and draining the treated fluid from the second chamber; and directing sludge formed by the skimmed flocs to a dewatering system.

25. A method for removing contaminants from a liquid, comprising the steps of:

filtering contaminant objects larger than a predetermined size from the liquid;

mixing the liquid to be treated with additives comprising at least one of a pH adjusting chemical, a reducing agent, a polymeric coagulant, a flocculant, and an absorbent;

pressurizing the liquid by introducing pressurized gas into the liquid stream;

dissolving gas into the liquid by introducing the liquid into an inlet of a hydrocyclone of a gasification device, directing the liquid exiting the hydrocyclone upwards to a liquid surface layer to remove large bubbles, and removing liquid containing dissolved gas from a bottom portion of a vessel of the gasification device;

reducing the pressure of the liquid by forcing the liquid through an orifice plate or a hydrocyclone; and separating the contaminants from the liquid by:

introducing the liquid at the bottom of a stratification separation tank so as to slow the flow of the liquid and cause the liquid to rise, cause small bubbles to expand, and create flocs;

directing the treated liquid into a second chamber having an adjustable weir and draining the treated fluid from the second chamber; and directing sludge formed by the skimmed flocs to a dewatering system.

26. The method of claim 25, including the step of adding additives to the liquid after the dissolving step.

27. The method of claim 25, wherein the mixing step comprises the utilization of a batch tank equipped with a mixer, directing the liquid through a series of hydrocyclones and adding one or more additives at each hydrocyclone, directing the liquid through a floc tube having multiple bends and adding one or more additives, or directing the liquid through in-line mixers and adding one or more additives.

* * * * *